(12) United States Patent
Junkin (10) Patent No.: US 6,193,610 B1
(45) Date of Patent: Feb. 27, 2001

(54) INTERACTIVE TELEVISION SYSTEM AND METHODOLOGY

(75) Inventor: William W. Junkin, Newport Beach, CA (US)

(73) Assignee: William Junkin Trust, Monarch Beach, CA (US)

( * ) Notice: Subject to any disclaimer, the term of this patent is extended or adjusted under 35 U.S.C. 154(b) by 0 days.

(21) Appl. No.: 08/939,205

(22) Filed: Sep. 29, 1997

Related U.S. Application Data (63) Continuation-in-part of application No. 08/583,408, filed on Jan. 5, 1996, now Pat. No. 5,860,862.
(60) Provisional application No. 60/027,443, filed on Sep. 27, 1996.

(51) Int. Cl.[7] ....................................... A63F 9/00

(52) U.S. Cl. .................................. 463/40; 463/9

(58) Field of Search .............................. 463/42, 9, 4, 40, 463/41, 36, 30, 31

(56) References Cited

U.S. PATENT DOCUMENTS

| | | |
|---|---|---|
| 4,592,546 | 6/1986 | Fascenda et al. . |
| 4,722,526 | 2/1988 | Tovar et al. . |
| 5,013,038 | 5/1991 | Luxenberg et al. . |
| 5,018,736 | 5/1991 | Pearson et al. . |
| 5,114,155 | 5/1992 | Tillery et al. . |
| 5,263,723 | 11/1993 | Pearson et al. . |
| 5,846,132 | * 12/1998 | Junkin . |
| 5,860,862 | * 1/1999 | Junkin . |

* cited by examiner

Primary Examiner—Mark A Sager
(74) Attorney, Agent, or Firm—McDermott, Will & Emery

(57) ABSTRACT

An interactive apparatus and method allows participants to compete in an interactive game, such as a contest or sporting event, occurring in real time or as a taped broadcast of a real time event. The event with which the participant may interact is broadcast live or previously taped but not aired. At home, participants can play along with the broadcast on a real time basis as a previously taped segment of the television show is aired. Interactive play may be accomplished by access to an on-line version of the game while the corresponding game show airs live or is rebroadcast to the participant for the first time on television.

20 Claims, 4 Drawing Sheets

INTERACTIVE TELEVISION SYSTEM AND METHODOLOGY

CROSS REFERENCES TO RELATED APPLICATIONS

This application claims priority to provisional application Ser. No. 60/027,443, filed on Sep. 27, 1996 and entitled "INTERACTIVE TV SHOW," and is a continuation in part application of application Ser. No. 08/583,408, filed on Jan. 5, 1996, now U.S. Pat. No. 5,860,862, and entitled "INTERACTIVE SYSTEM ALLOWING REAL TIME PARTICIPATION."

TECHNICAL FIELD

This invention relates generally to interactive telephone, and more particularly to interactive television technology enabling participants to engage in television programming such as sports, games and other events, on a real time basis.

BACKGROUND ART

The television has become a hallmark in the electronics industry since its inception in the early to mid 1900s. With the rising popularity of the television came the television game show. Television game shows allow "at home viewers" to watch contestants play game shows in the studio while viewing the contestants on television. Today, game shows continue to exist on television and "at home viewers" still continue to watch the game shows from home, via television as non-participants. Additionally, there are any number of sporting events which "at home viewers" watch as well as non-participants.

An advantage of the present invention is in increasing the enjoyment of an interactive game.

Another advantage of the present invention is an improved interactive system allowing participants to interact with a game as an event occurs in real time.

A further advantage is in increasing both the intellectual and emotional enjoyment to a participant viewing an event such as a sport.

Still a further advantage of the invention is in increasing the level of skill and knowledge of a participant to an event such as a sport.

DISCLOSURE OF THE INVENTION

According to the present invention, "at home viewers" can become "at home viewers/players" and will be able to participate as a contestant on the game show or in a contest or game created around an individual sporting event or series of sporting events while it is aired on television. According to one aspect of the invention, "at home viewers/players" can play along with the studio contestants live, in real time, as the show actually airs. These same "at home viewers/players" would also be able to participate in a game or contest created around a specific live sporting event or series of events. These "at home viewer/players" could, depending on the game show and the way in which the game show has been constructed, play along as partners with studio contestants, or they could play in competition with the studio contestants. Alternatively, a separate pool of players from among the "at home viewer/players" group could be created to include or not include the studio contestants. Similarly, these groups could play in competition against one another.

The "at home viewer/player" for a game constructed around a live or taped but previously untelevised sporting event could be organized into competitive units much like the leagues set up for many fantasy sports games and contests and could play within their league as well as against all other players in other leagues.

According to another aspect of the present invention, it is not necessary that the event be live since it could be something that was previously taped but not aired and so for the viewer it is live for all intensive purposes. "At home viewers/players" could play along on a real time basis as a previously taped segment of the television show is aired. Since the taped show is being rebroadcast, the game being played by the "at home viewers/players," in this case, would be independent from the game being played by studio contestants. In this case, the game could be separate from, and not rely on a live broadcast show for the content of the game the "at home viewers/players" are playing. This might be accomplished through use of a game within a game (for example, guess which studio contestant will win) or an overlay of additional questions (possibly of the same type and format or game elements) on a screen overlay broadcast live as the taped show airs.

In another aspect of the invention, interactive play could be accomplished by access to an on-line version of the game played in real time on the Internet and/or an audio text delivery system as the taped show airs on television.

In another aspect of the invention, interactive play could be accomplished through access to a digital satellite system. A specific channel could be "purchased" and designated to the "at home viewers/players" as a "game show" channel. When the "game show" channel is in use, the "at home viewers/players" can participate in interactive play. Alternatively, interactive game shows could be aired on any selected channel at random times, much like regularly scheduled television shows.

To participate the "at home viewer/player" would purchase a "game show" package from the satellite television company that provides him with a set number of "game plays." The game is broadcast on screen at the same time as the event on which the game is based via the interval blanking unit on the bottom of the screen or the "at home viewer/player" has to switch between the actual broadcast of the event on which the game is based and the "game show channel" on which are the interactive elements that allow him to participate in the game or contest.

In another aspect of the invention, the "interactive tv show" application can be utilized as a vehicle for direct marketing. Typically, telephone systems are not capable of handling mass amounts of callers to the same 800 number at the same time which is why direct response spots never air during prime time television. Using this application would enable a direct marketer to create a "new" phone system, one capable of handling a larger amount of callers than currently implemented phone systems, the consumer will be able to utilize direct market advertising. This will enable the "at home viewer" to participate in direct marketing through use of an audio text delivery and in response to touch tone telephone input. Alternatively, the consumer can implement this application in conjunction with the internet in order to utilize direct marketing advertising.

In accord with one aspect of the invention, an interactive game system comprises a controller for generating real time score values indicative of performance of players involved in an event; an interactive device for displaying video information to a participant of an interactive game based on the event; and a communication network coupling the controller and the interactive device such that the real time score values are conveyed to the participant.

Methodology for implementing the invention includes the steps of generating real time score values indicative of performances of players involved in an event, conveying to each participant the real time score values of the players and, on the basis of the real time score values, receiving information or commands from the participant.

Additional objects, advantages and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF DRAWINGS

The invention will be described in detail with reference to the following drawings in which like reference numerals refer to like elements wherein:

FIG. 1(A–B) are illustrations of the present invention in accordance with one embodiment;

FIGS. 2(A–B) are illustrations of the present invention in accordance with another embodiment;

FIGS. 3(A–B) are illustrations of the present invention in accordance with another embodiment of the present invention;

FIGS. 4(A–B) are illustrations of menus on a display device of an interactive device illustrated in FIGS. 1B–3B of the present invention.

BEST MODE FOR CARRYING OUT THE INVENTION

Figure 1A:
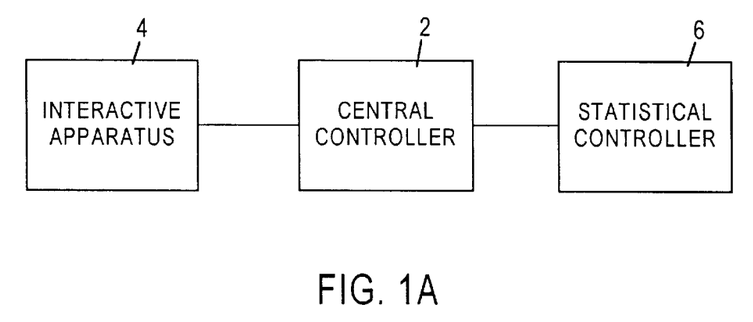
Figure 1B:
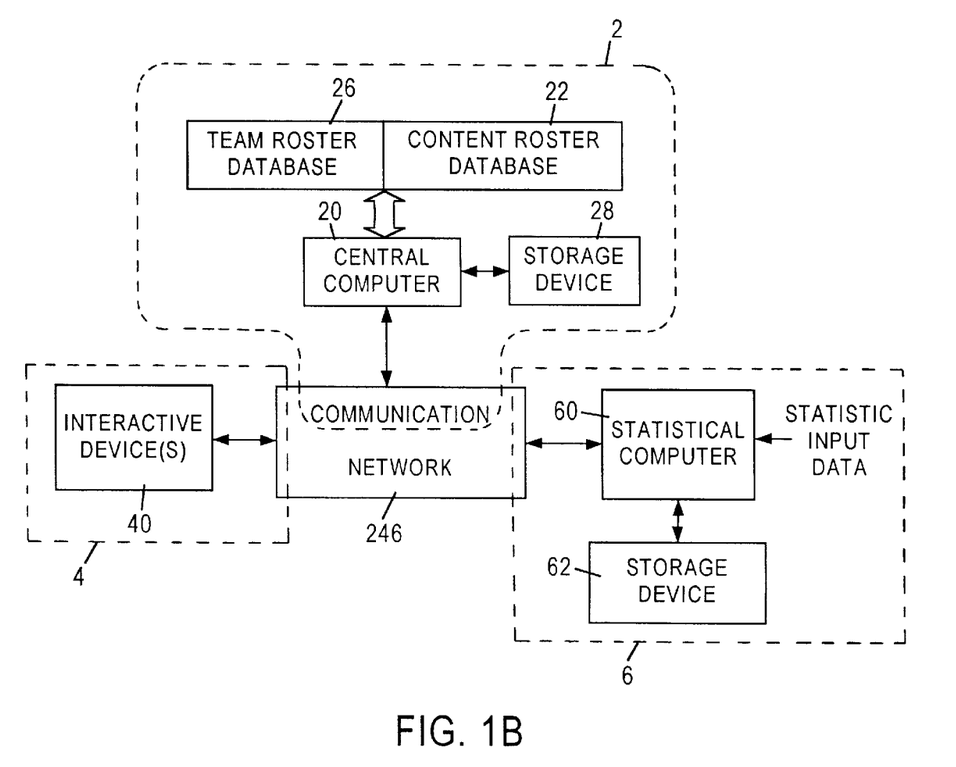
Figure 2A:
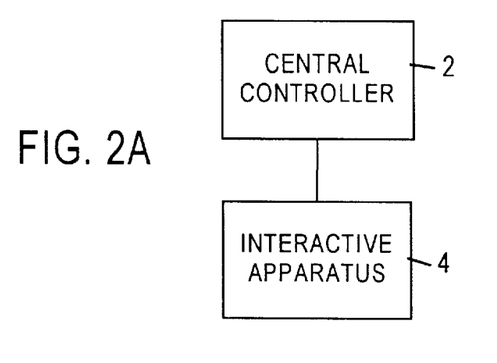
Figure 2B:
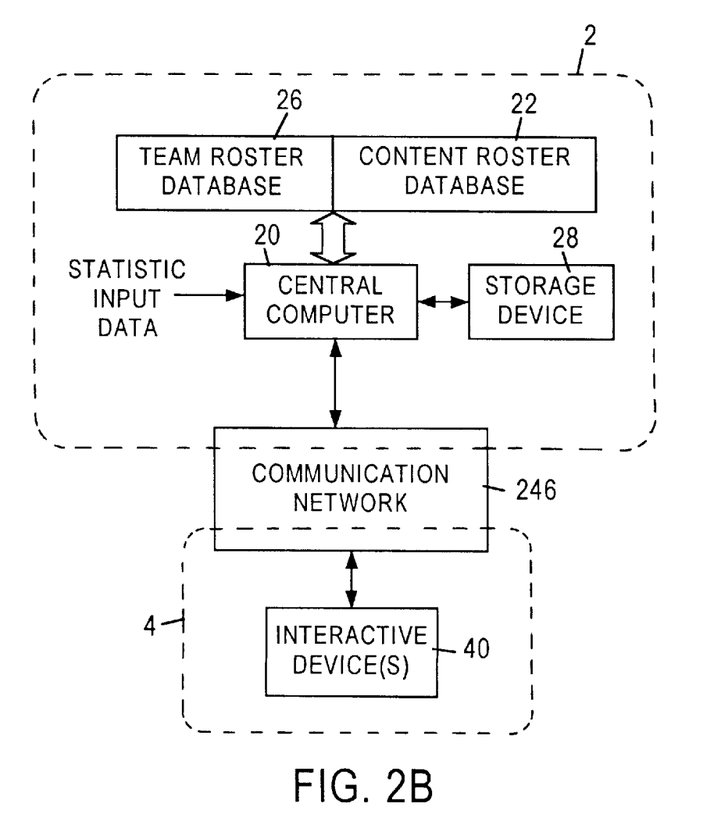
Figure 3A:
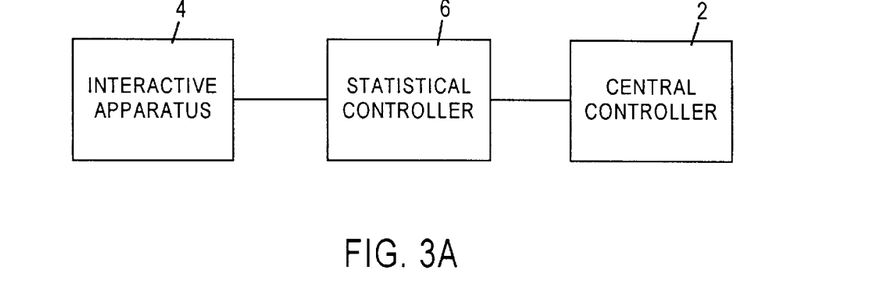
Figure 3B:
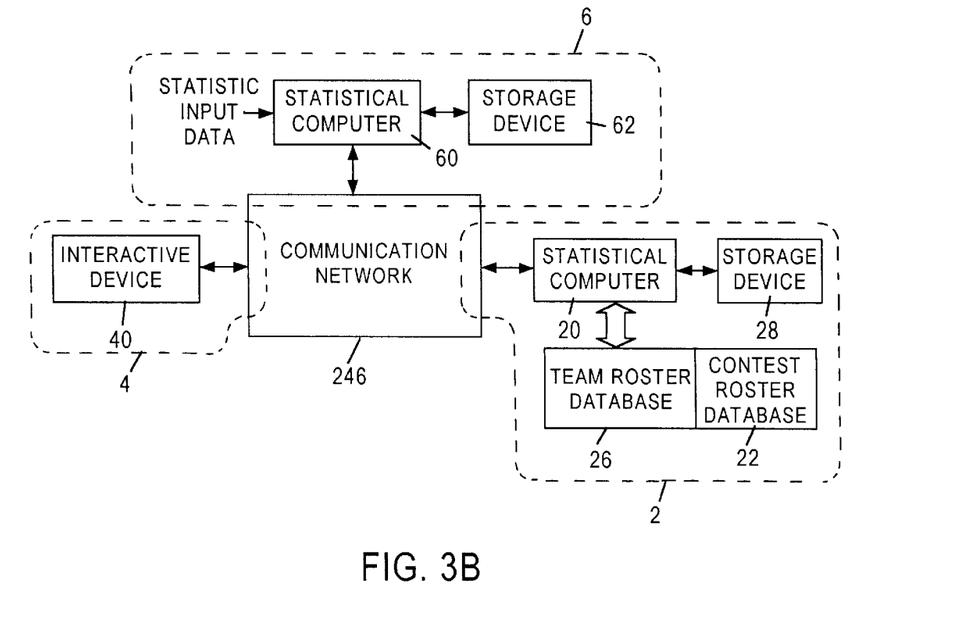

FIGS. 1A–3A illustrate three different embodiments of the present invention, and FIGS. 1B–3B illustrate detailed components of the systems illustrated in FIGS. 1A–3A. In the FIGS. 1(A–B) and 2(A–B), a central controller 2 is coupled to an interactive apparatus 4 and/or a statistical controller 6 while in FIG. 3 (A–B), the statistical controller 6 is coupled to both the interactive apparatus 2 and the central controller 4. The central controller 2 includes a central computer 20 coupled to a contest roster and team roster databases 22 and 26, a storage device 28 and a communication network 246. The interactive apparatus 4 includes an interactive device(s) coupled to the communication network 246. The statistical controller 6 comprises a statistical computer 60 coupled to a storage device 62 and the communication network 246, and receiving statistical input data. In the embodiment of FIGS. 2 (A–B), the central computer 20 directly receives the statistical input.

Communication Network

The communication network 246 couples the interactive device 40, the central computer 20 and/or the statistical computer 60. The dotted lines indicate that each of the central controller 2, interactive apparatus 4 and the statistical controller 6 include appropriate devices for communication. For example, the apparatus 4 and controllers 2 and 6 may include modems for telephone line communication and transmitters and/or receivers for optical, cable, microwave or satellite communication to allow the participants to interact in the game in real time while watching a display device of the interactive device showing the event or a video program. Alternatively, communication between the participant and central controller can be audio text delivery in response to touch tone telephone input.

Central Controller

The central computer 20 includes or has access to the contest roster database 22 which includes a list of athletes which can be relied upon in the contest or the event. Computer 20 has access to the team roster database 26 which includes the team rosters as selected and entered by each of the participants, including identifying information which associates a team roster to the corresponding participant. The central computer 20 also has access to the player score for each player on the contest roster database 22. Although the contest roster and team roster databases 22 and 26 are shown in unity, they can be separate databases.

The central computer 20 is adapted to recognize and distinguish machine recognizable signals transmitted from the interactive device 40 and/or statistical computer 60. The central computer 20 may be implemented by any of a plurality of commercially available computer systems. The processing and storage capacity needed depends upon the anticipated number of participants. The storage device 28 may be any one of a plurality of commercially available devices, such as a floppy or hard disk, magnetic or optical, or any combination thereof.

The contest roster database 22 includes a list of athletes or players who participate in the relevant sport. Preferably, the contest roster database 22 lists or includes all of the actual players in the professional league (or alternatively the players in a particular college conference or division or the players participating in a specified event) of the sport associated with the contest. In addition to personal favorites, the contest roster database 22 includes those players likely to have an impact on the sport during the season. The number of players included on the contest roster database 22 may be chosen according to specific considerations of the relevant sport or event and will not necessarily include all the actual athletes who play the sport.

For sports such as basketball or hockey, wherein each position of the team is highly significant, each professional team typically has more than one player for each position in real life. To closely simulate such real life situations within the interactive system, the contest roster database 22 may include more than one player from each professional team for each position. Further, similar positions may be classified within a single category.

For example, in real life baseball, the right fielder, center fielder and left fielder may be treated collectively as outfielders. The contest system may incorporate a contest roster database 22 which categorizes all players who play right field, left field, and center field in real life, collectively, as outfielders. In the preferred embodiment of the contest system, a participant may choose three outfielders from the contest roster database 22 even if they all, for example, play center field in real life.

Also, some positions of the event may inherently generate very few statistics used to gauge a player's performance. Such positions need not be included as a category within the contest roster database 22. For example, in real life football, the guard and tackle positions generate relatively few distinguishing characteristic statistics such as yards gained or touchdowns. Therefore, the contest roster database 22 may not include these positions or players. However, even if a position is not included as a category on the contest roster database 22, a particular athlete playing that position may still be included on the contest roster database 22 if that particular player is likely to generate statistics accounted for in the player score calculation.

Therefore, the positions and players listed on the contest roster database 22 may represent an accommodation of the characteristics of the sport, as typically monitored by the sports industry. In other words, since a player's performance is typically monitored in relation to the statistics which the player generates, it is probable that those players who are likely to generate statistics will be selected to appear in the contest roster database 22. The statistics which are recognized throughout the industry as indicators of a player's performance, are advantageously included as factors when calculating player score.

In events such as NASCAR or golf, there are generally no teams. In such a sport, the participant can select a prescribed number of players/members of the event to comprise his team. The prescribed number can be a wide range of numbers, but equal to at least one. The participant can select one or more players in the event the participant believes will score well based on the scoring system established for the contest.

Further, an event may run for a single day or a number of days. In a sport like tennis, there is an elimination process, and in sports like golf and NASCAR, the players must qualify to continue playing in the event by playing above a specific level. In track and field, different events are held on different days. Other sports require several days of competition to determine the winner of an event. Although sports like basketball are usually completed in a day, there are occasions, such as the NCAA Basketball tournament, where an elimination process is used to determine the winner over several days or weeks.

If an event is played over several days, the participants can select and trade from the contest roster database 22 the players who will be competing that day to comprise the teams. A winner of the interactive game can be chosen based on the highest score for the day or the highest aggregate score during the entire event. The participants may forego the qualifying round of the event, and choose from the contest roster database 22 the players who have qualified for the final round of the event. The winner of the interactive game may be chosen based on the highest score for each day of the final event or the aggregate highest score over the days in which the final event is held. Alternatively, the participant can participate in a combination of the above.

For example, in a golf tournament which usually lasts four days, the participant can play the interactive game for the entire four days, only the last two days after the qualification rounds are over, or just the final day of the competition, however that particular interactive game is structured. A winner of the interactive game can be chosen based on the aggregate scores of the participants for the entire four days or based on the scores for each day. If the participant chooses to participate during the last two days of the final rounds, a winner can be chosen based on the aggregate scores for both days or a winner with the highest scores for each day.

Preferably, each player on the contest roster database 22 is associated with a specific code uniquely identifying that specific player with respect to all other players in the contest roster database 22. For example, each player of the golf tournament is identified by a four-digit numerical code. The numerical code is used to identify a specific player during communications between the participant and the central controller 2.

In addition to the identification code associated with each player in the contest roster database 22, a quantitative indicator of each player's performance for each day or cumulative over a season, or in weekly increments can be included in the contest roster database 22. The quantitative indicator of a player's performance is determined as a function of the player's real life statistics. Each player's real life statistics are available through the statistical controller 6 (discussed in detail hereinafter), as illustrated in FIGS. 1(A–B) and 3(A–B) or through the central controller, as illustrated in FIGS. 2(A–B). The real life statistics of a particular player are converted into a quantitative (i.e., numerical) score by means of the game system formula.

Figure 4A:
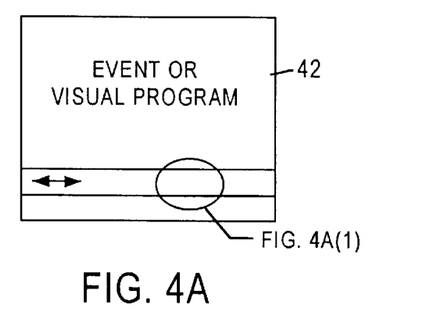

A list of the players in the contest roster database 22, along with each player's code number are displayed on a display device of the interactive device 40. The list can be continuously shown on a "ticker tape" 50 displayed on the screen, as illustrated in FIG. 4A, and can be updated in real time as the event takes place. A display format different from a ticker tape is, of course, possible. Further, the participant can access more information on the players in an event by appropriate commands inputted into the interactive device 40 by the participant.

The team roster database 26 includes a list or array of team rosters as entered by each participant. Each participant may be asked to identify himself or herself by some means, such as a home telephone number, a social security number and/or a combination thereof. The participant is asked to choose a team roster of players from the contest roster database 22. The team roster is then converted into digital information and stored as an individual file in the team roster database 28. Each file is addressed or accessed in a conventional manner using the information disclosed by the participant, e.g., the participant's social security number, as an address code.

Each participant's team roster file also includes the cumulative real time team score, and the cumulative up-to-date team score. In addition to these scores, each team roster in the team roster database includes the answers to one or more tie-breaker questions as entered by each participant (described hereinafter). Once a participant has selected a team roster, a person may only access the selected team roster using the identification information provided by the participant. A participant can access in real time his or her selected team roster in order to evaluate the performance of the team, to verify the players on the current team roster, or to trade a player from the team roster.

Statistical Controller

The statistical controller 6 includes a statistical computer 60, a storage device 62, and receives the statistical input data. The statistical computer 60 also has within its memory the formula used to convert the selected player statistics into a numerical performance value for each player. The statistical computer 60 continuously computes the numerical performance value for each individual player as it receives the statistical input data. The statistical controller 6 is separate from the central controller 2 in the embodiments of FIGS. 1(A–B) and 3(A–B). As shown in FIGS. 2(A–B), the functions provided by the statistical controller 6, including the calculation of the player score, can be combined with those performed by the central controller 2 such that only one computer system is required.

In the embodiments of FIGS. 1(A–B) and 3 (A–B), the statistical controller 6 provides a list of selected statistics for each member of the contest roster database 22. The statistical controller 6 provides the selected statistics corresponding to the actual performances of each of the athletes listed in the contest roster database 22. These selected statistics are continually updated in real time basis as the event takes place. Although a wide variety of statistics may be employed, the chosen statistics represent the most popular aspects monitored in the event.

The real time statistics of each player listed in the contest roster database 22 are received and inputted into the statistical computer 60. The storage device 62 stores the real time statistical input data when there is an overflow of data or the central computer is not ready to receive the performance score. The real time statistics of each player are evaluated by the statistical computer 60 according to the player score formula so that a quantitative performance indicator score for each player is obtained on a real time basis. The quantitative performance indicator scores are then sent via the communication network 246 to the contest roster database 22 via the computer 20. Alternatively, the central computer 20 receives the real time statistical input data, and performs the calculations to determine the scores for each player, as shown in FIGS. 2(A–B).

Calculation of Individual Player Score and Team Score

The interactive system provides for the evaluation of the players according to selected real life statistics from the statistical input data. In the embodiment of FIGS. 1(A–B) and 3(A–B), the calculation of the individual player scores is done by the statistical computer 60 within the statistical controller 6. Alternatively, the central computer 20 can perform such calculations, as illustrated in the embodiment of FIGS. 2(A–B). The player score calculation includes a plurality of factors which correspond to the characteristics provided by the statistical input data. The score calculation allows for the evaluation of each player on the contest roster database 22 according to the statistics generated by that player. For instance, a player with a particular score would be evaluated as doing better than another player who has a lower score. Hence, a quantitative comparison can be made between players on the contest roster database 22.

The player score calculation may provide for the weighing of certain statistics depending on the importance, difficulty or occurrence rate of each statistic. In addition, the player score calculation may be uniquely tailored to accommodate a particular event. Preferably, the formula for calculating the player score is available to all participants so that each participant may conduct an independent evaluation of their team roster with respect to the players on the main contest roster database 22.

For example, in NASCAR racing, racers/players can score points for lap speed, number of laps leading the race, number of laps in second place, third place, fourth place, etc., length of pit stops, position when race is finished and combinations thereof. If, for example, Kyle Petty has the fastest lap time of 202.5 mph, he can score a particular number of points. If Petty makes a pit stop of 44 seconds to change his tires, which is much longer than the usual pit stop during the race, he loses a particular number of points from his total performance score. During the next lap, if he passes fourteen cars and moves to within five cars of the leader, Petty can gain some appropriate number of points for both passing fourteen cars and being in fifth place after one lap.

In golf, the golfers/players can score points for a hole in one, an eagle, a birdie, the longest drive on a hole, first on the green, closest to the pin, first in the hole, low score, total score, etc. For example, if John Daley is on a team, and his first shot off the tee is the longest drive on the hole, he scores a prescribed number of points for this achievement. If his next shot lands in the front of the bunker off the left side of the green, and another player lands his ball on the green first, the other player gains some points for being the first one on the green. Although Daley does not lose any points, he has lost his opportunity to gain additional points. If his next shot is closest to the hole, Daley scores additional points and more points if he putts for a birdie.

Interactive Apparatus

Figure 4B:
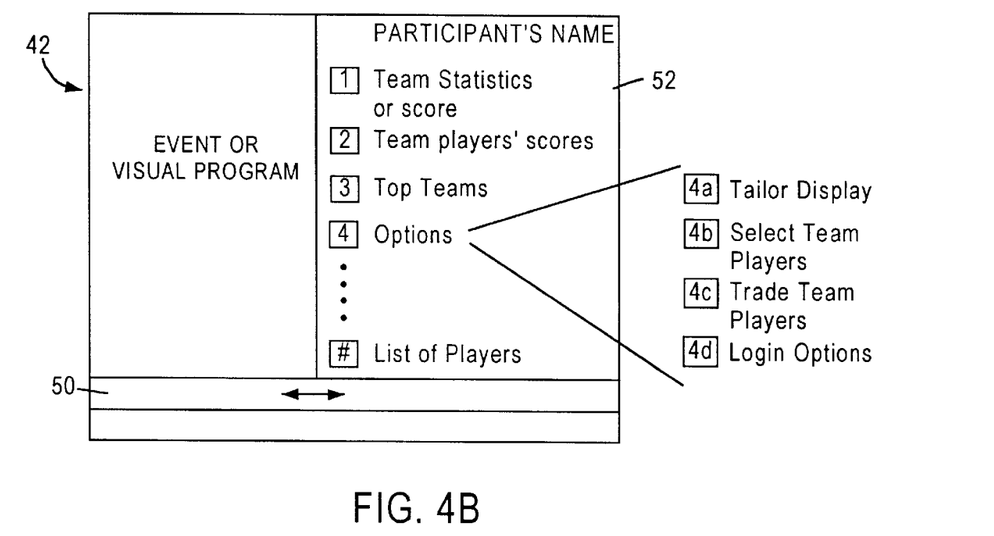

FIGS. 4A and 4B are illustrations of displays of the interactive device 40. As shown in FIG. 4A, a ticker tape 50 is shown at the bottom of the display screen as the participant is watching the event such as golf or a non-event related visual program. The statistical controller 2 and/or the central controller 6 communicates with the interactive device 4 to visually provide the event and the ticker tape 50. The ticker tape 50 contains the real time score values regarding the performance of the athletes/players of the event.

While the participants are watching golf, the ticker tape 50 continuously, intermittently or on player demand provides up-to-date real time performance score values of the players. For example, the ticker tape may show John Daley's initials or code followed by his aggregate score or the number of points in each category, e.g., a hole in one, an eagle, a birdie, the longest drive on a hole, first on the green, closest to the pin, first in the hole, low score, total score, etc. Alternatively, the ticker tape 50 can show the category followed by top three players in each category and/or points the players have accumulated in that category. The ticker tape 50 can also show top teams and the points of each team. As can be appreciated, the format of the ticker tape 50 can be tailored in any fashion based on the information provided by the central controller 2 and the statistical controller 6. Further, the ticker tape 50 can be located at any appropriate location on the display. Display formats other than a ticker tape are possible, e.g., a separate screen or split screen of either horizontal or vertical orientation.

Figure 4C:
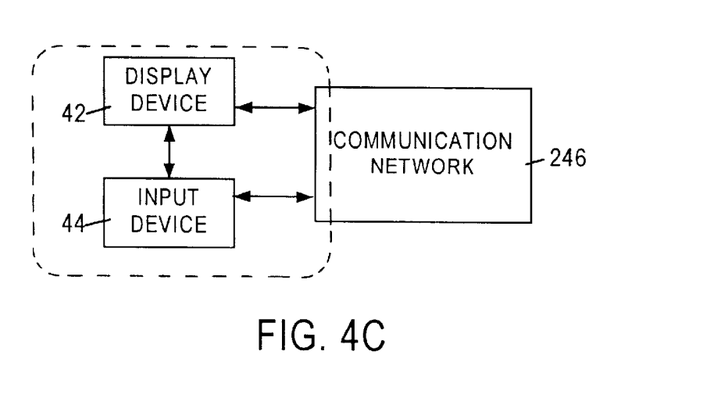
FIG. 4C is a detailed illustration of the interactive device illustrated in FIGS. 1B-3B of the present invention.

To implement the display of the event or the visual program, the interactive device 40 includes a display device 42, as illustrated in FIG. 4C. The display device 42 may be a television screen, a display device of a computer system, etc. The central controller 2 and/or statistical controller 6 can transmit such a visual display by broadcasting (via satellite or microwave transmission), by telephone (via modem), by communication lines (via cable or optical fiber), any combination thereof or any other one- or two-way communications device. The transmitter and/or modem of the central controller 2 and/or statistical controller 6 transmits the event and/or ticker tape in real time to the receiver and/or modem of the interactive device 42.

The participant can access his team roster anytime using an input device 44. The input device 44 may be a keyboard of a computer, a telephone pad, touch sensors on the display device 42, remote control of the television, sensors for voice synthesizer, or combination thereof. After inputting the appropriate identification information, such as the participant's social security number, telephone number, password, identification number or combination thereof, the central controller 2 or the statistical controller 6 transmits to the display device 42 a menu 52 adjacent to the actual event or the visual program, as illustrated in FIG. 4B. Alternatively, athlete's scores may be displayed/heard only via audio text, not on screen, e.g., if a participant is using a computer there will be a visual display but if the participant is limited to a phone, there will be provided an audio menu.

The menu 52 can show the name of the participant, the names of the players on the participant's team, total points of each player on the team, top players in each category of the event, scores of top teams among the participants, total score of the participant's team, teams in a private league, total score of the team over the season, list of players available in the contest roster database 22 or a combination thereof. Further, the menu 52 includes an option menu to tailor the display of the menu 52. As can be appreciated, the format of the menu can be tailored in any fashion based on the information provided by the central controller 2, the statistical controller 6 and the needs of the participant.

Included in the option menu are options for tailoring the menu 52, selecting the team players, trading team players and login options to change the identification information. To access or change any of the information on the menu 52, the participant can input the appropriate command via the input device 44. For example, to access the option menu, the participant can press the arrow keys on a keyboard to highlight the option menu and press the enter key. The participant can press the numeral 4 on the remote control of the television, the keypad of the telephone or the keyboard of the computer. Even while the participant is accessing the menu 52, the ticker tape 50 provides up-to-date real time score values about the performance of the players in the event. The ticker tape may be displayed continuously, intermittently or on user demand. Scores may be broadcast in alphabetical order of players, and the touch tone pad of a telephone can be used by the participant to skip ahead or drop back, similar to a voice mail system.

As an alternative to visual display of a ticker tape or the like on a TV screen in normal broadcast, the player and team information may be conveyed to participants in other ways. For example, telephone participants may receive the information in audio form only, or alternatively in audio-video form, over network lines on a demand basis. Another possibility is display on a PC display which may present the information interactively.

Interactive Game

While watching the visual program or the event on the display device 42, the viewer sees the ticker tape 50. For example, a viewer is watching a golf tournament on television, and the ticker tape 50 appears at the bottom of the screen showing the real time performance score values of the golf players. The ticker tape 50 also periodically provides information to the viewer brief information about the interactive game, and the telephone number to call to participate in the interactive game, the telephone number to access the central controller 6 via a computer modem or the appropriate command on the television remote to access the central controller 2.

For simplicity, the following is a description of a system where the display device 42 is a television coupled to a communication network 246 comprising a cable line with a cable box which allows a viewer to send information to the central controller 2 by depressing appropriate keys on the remote control, and the television 42 displays the information received from the central controller. When the viewer decides to participate in the interactive game of golf, the viewer depresses an appropriate key command on the remote, which may be a sequence of numbers or an "activation" key on the remote. The command is transmitted to the central controller 2, and the controller responds by transmitting onto a portion of the display of the television asking the viewer to enter his identification information. Other possibilities include viewer entry by touch tone phone or PC with modem communication.

The controller 2 verifies the identification information by searching the cable subscription membership list stored in the storage device 28. If the identification information is incorrect, the controller 2 transmits over the cable line to the cable box or other device for displaying a message on the television screen that the identification information is incorrect, and instructions to reenter the identification information. If the identification information is correct, the controller 2 will transmit the video information over the cable line to the cable box for displaying the menu 52 onto the television screen. Alternatively, each cable subscriber can be given a unique code when he/she subscribes to the cable service. The unique subscription code can be used to activate the interactive game.

Since the viewer/participant is accessing the interactive game contest for the first time, the menu includes a menu driven option for finding out more about the interactive game and the rules for playing the game. Further, the menu 52 provides a message to access the options menu for selection of players on participant's team. When accessed by depressing the appropriate number on the keypad, the participant selects the "select team player" menu. The central computer 2 then transmits onto the television screen a list of the players in the event, which may be displayed in alphabetical order, by category, by age, by real time score values, etc.

When a player is selected, the controller 2 transmits onto the view screen all the statistical information regarding the player, including past performances and real time score values accumulated by the player in each category. If the participant wants the player on his team, the participant depresses the key or keys on the remote control 44 indicating selection of the player, and the player is added to the participant's team. The participant repeats this process until all the players of the team have been selected, and exits the selection menu by depressing the appropriate key sequence on the remote control, where the menu 52 continuously provides relevant information for navigating through the menu 52.

The participant completes the initial selection process sometime prior to the start of the golf tournament depending on how long the golf tournament lasts. For example, if the tournament runs four days, but the contest covers only the last two days of competition, the participant can select his team prior to the last two days of the tournament. Further, the interactive system includes a process in the selection process to lessen the likelihood that the participants will choose the same players of the tournament. This process may employ a salary cap, a requirement to choose a given number of players from different pre-established skill/value categories, a selection of players prior to the start of the event and prior to any of the players being eliminated from the competition or any combination thereof. Other criteria can be chosen based on the event.

However, there is a possibility that some participants will have the same highest score at the end of the golf tournament. Hence, the menu 52 also directs the participant entering the interactive game for the first time to answer a prescribed number of tie-breaker questions, and the answers are stored in the team roster database 26. For example, the participant is required to provide an answer which player will have the lowest score after the golf tournament, which player will have the most number of pars, birdie, eagle, etc., which player will lead the tournament after all the players have played the ninth hole, etc. A combination of such question can be used, and the answers are used at the end of the tournament to break the tie between the participants. Whoever provided answers which most closely match the actual outcome of the tournament will be the winner.

Once the initial login and selection processes have been completed, the participant is ready to play the interactive game. To promote competition, prizes may be given to teams with the highest scores after each hole is played, after each day of competition, after each period of play during the qualifying round and actual rounds of the golf tournament and after the entire four days of the tournament, etc. Further, if an event, such as basketball, is played during a season, prizes may be given to a team with the highest score after the season, after each weekly period or after a single game or event. Prizes may also be awarded to participants at random to encourage participants who do not have high team score to participate in the interactive game.

Because the factors which are likely to affect the performance of a given player are generally better evaluated by those participants who are familiar with the particular event associated with the interactive game, those participants who are knowledgeable in the event are more likely to choose high team scoring rosters. Hence, a certain skill factor is involved which gives those participants who are knowledgeable in the event associated with the interactive game an advantage.

However, some participant may be new to the event, and less skilled. The menu 52 allows the participant to be involved in different levels of the interactive game. There may be a beginners level, intermediate level and advanced level. To encourage the participant to more actively participate in the interactive game and to become more skilled, the prizes can be given to the participants within each level, and the prizes at the advanced level may be more valuable compared to the beginners level.

The primary objective of the interactive game is to optimize/maximize the total points generated by the participants' team roster. Throughout the golf tournament, the interactive game apparatus permits each participant to optimize the scoring potential of the individual team roster through an exchange of players between the participant's team roster and the contest roster database 22. As indicated previously, the same player may be selected by more than one participant and thus a given player could conceivably be included as a member of all of the team rosters. Further, the trading is done in real time.

For example, a participant is watching the golf tournament on television and the ticker tape 50 displays in real time the performance of the players during the event. This display can be continuous, intermittent or on player demand. Alternatively, the participant may be watching a video program such as a sitcom, and the ticker tape 50 continuously displays the real time performance score values of the players in the golf tournament. The participant can access the menu 50 anytime while watching the television by depressing the appropriate key or key sequences on the remote control to find out the performance of his team and team members. Such access command may be the unique subscription code of the participant.

Once accessed, the various information as described above are shown to the participant. Either through the ticker tape 50 or by watching the golf tournament, the participant realizes that John Daley is about to tee off on the eighth hole. The participant can access from the central controller 2 the statistical information regarding John Daley. Based on the statistics, the participant believes that John Daley will have the longest drive at the eight hole, and will have a good round on the eighth hole. The participant accesses the trade option from the menu 52, and decides to change one of his poor performing team player for John Daley. The trade is immediately implemented by the central controller, and adds John Daley as a member of the participants' team and removes the traded player from the team.

Once the trade has been made, the participant can watch with excitement as to whether his trade was the right one or the wrong one. If John Daley drives the longest drive off the tee, John Daley receives a prescribed number of point values, and the team point value increases. If John Daley does not hit the longest drive, the team value remains the same. In fact, the player which the participant has traded hits the longest drive. Hence, the participant missed his opportunity to gain more points for his team by trading the player.

As can be appreciated, there must be some restriction in the number of trades that can be made, when trades can be made, how late in the event trades can be made, who can be traded, etc. In the above example, the participant cannot trade John Daley for the same player that was traded earlier, after John Daley has teed off. Such restrictions help to sharpen the skill of the participant by motivating the participant to make the right trades depending on the statistics of the players. These restriction on trades will change based on the specific event involved and the media partner and/or sponsor.

In the embodiments of FIGS. 1 and 3, the circuitry to implement the functions of the central controller 2 can be provided by a company independent of a video program sponsor of the event who provides the circuitry to implement the functions of the statistical controller 6. Alternatively, a company can provide the statistical input data independent from the company providing the circuitry to implement the functions of the statistical controller 6. In the embodiment of FIG. 2, an independent company can provide the statistical input data from the company providing the circuitry necessary to implement the functions of the central controller 2. As can be appreciated, many variations are possible to implement the functions of the central and statistical controllers 2 and 6.

As described above, the interactive device 40 can be a computer. In such an instance, the participant can receive video information to display the golf tournament and display the menu 52 on the computer screen via modem communication. With the microprocessor, the computer can be provided with the necessary program to independently calculate the performance score of the team from the statistical controller 6. Such a set up may be useful in the embodiment illustrated in the embodiment of FIGS. 2(A–B). Further, the computer can be provided with the necessary software to allow a group of participants to have their own private league.

For example, participants A, B, C and D are friends. They wish to set up a private league where each of their computers can calculate in real time the performance of their teams A, B, C and D. Each believes that he/she is more knowledgeable than the others. Each sets up their own team, and award each other prizes for having the highest score in each category or highest team scores at the end of a play during the event or after the entire event is over. By allowing the computers to set up their own league, each participant can be continuously informed of the performance of the other participants' teams. Such arrangement increases the enjoyment and competitive nature of the interactive game.

According to the present invention, "at home viewers" can become "at home viewers/players" and will be able to participate as a contestant on the game show or in a contest or game created around an individual sporting event or series of sporting events while it is aired on television. According to one aspect of the invention, "at home viewers/players" can play along with the studio contestants live, in real time, as the show actually airs. These same "at home viewers/players" would also be able to participate in a game or contest created around a specific live sporting event or series of events. These "at home viewer/players" could, depending on the game show and the way in which the game show has been constructed, play along as partners with studio contestants, or they could play in competition with the studio contestants. Alternatively, a separate pool of players from among the "at home viewer/players" group could be created to include or not include the studio contestants. Similarly, these groups could play in competition against one another.

The "at home viewer/player" for a game constructed around a live or taped but previously untelevised sporting event could be organized into competitive units much like the leagues set up for many fantasy sports games and contests and could play within their league as well as against all other players in other leagues.

According to another aspect of the present invention, it is not necessary that the event be live since it could be something that was previously taped but not aired and so for the viewer it is live for all purposes. "At home viewers/players" could play along on a real time basis as a previously taped segment of the television show is aired. Since the taped show is being rebroadcast, the game being played by the "at home viewers/players," in this case, would be independent from the game being played by studio contestants. In this case, the game could be separate from, and not rely on a live broadcast show for the content of the game the "at home viewers/players" are playing. This might be accomplished through use of a game within a game (for example, guess which studio contestant will win) or an overlay of additional questions (possibly of the same type and format or game elements) on a screen overlay broadcast live as the taped show airs.

There are several ways in which the interactive television show may be played. A new game show could be produced with an interactive element as a part of the program, an existing television show (which no longer airs and to which rights have been produced) could be reintroduced into the market with a new interactive element as part of the revitalized show, or an existing game show currently on the air could be adapted to include the new interactive element. Similarly, these same concepts could be us4ed to create a game or contest surrounding a specific sporting event or series of sporting events to provide the "at home viewer/player" an opportunity to participate in a game or contest based on that specific sporting event or series of events.

The interactive play could be accomplished in some or all of the following manner(s). In one aspect of the present invention, interactive play could be accomplished by access to an on-line version of the game. The game would be played in real time on the Internet and/or an audiotext delivery system while the show airs live on television simultaneously.

In another aspect of the invention, interactive play could be accomplished by access to an on-line version of the game played in real time on the Internet and/or an audio text delivery system as the taped show airs on television.

In order to implement the audio text delivery system, some current component of the Internet delivery system may be utilized. For example, rather than using a single 800 number nationally, one might use local telephone nodes to connect the audiotext players to the game computer. This would enable the simultaneous limited user capacity of current 800 numbers to be expanded by utilizing the local telephone nodes which are currently implemented to provide connectivity of computer modems to on-line services or the Internet directly. Alternatively, local telephone nodes, not currently used by on-line services and/or Internet service providers, could be set up with the audiotext delivery system.

In another aspect of the invention, interactive play could be accomplished through access to a digital satellite system. A specific channel could be "purchased" and designated to the "at home viewers/players" as a "game show" channel. When the "game show" channel is in use, the "at home viewers/players" can participate in interactive play. Alternatively, interactive game shows could be aired on any selected channel at random times, much like regularly scheduled television shows.

To participate the "at home viewer/player" would purchase a "game show" package from the satellite television company that provides him with a set number of "game plays." The game is broadcast on screen at th same time as the event on which the game is based via the interval blanking unit on the bottom of the screen or the "at home viewer/player" has to switch between the actual broadcast of the event on which the game is based and the "game show channel" on which are the interactive elements that allow him to participate in the game or contest.

In another aspect of the invention, the "interactive tv show" application can be utilized as a vehicle for direct marketing. Typically, telephone systems are not capable of handling mass amounts of callers to the same 800 number at the same time which is why direct response spots never air during prime time television. Using this application would enable a direct marketer to create a "new" phone system, one capable of handling a larger amount of callers than currently implemented phone systems, the consumer will be able to utilize direct market advertising. This will enable the "at home viewer" to participate in direct marketing through use of an audio text delivery and in response to touch tone telephone input. Alternatively, the consumer can implement this application in conjunction with the internet in order to utilize direct marketing advertising.

While this invention has been described in connection with what is presently considered to be the most practical and preferred embodiment, it is to be understood that the invention is not limited to the disclosed embodiment, but is intended to cover various modifications and equivalent arrangements included within the spirit and scope of the disclosed invention.

What is claimed is:

1. An interactive game system comprising:
    a controller for generating real time score values indicative of performances of players involved in an event;
    an interactive device for displaying video information to a participant of an interactive game based on the event; and
    a communication network coupling said controller and said interactive device such that the real time score values are conveyed to the participant.

2. The interactive system of claim 1, wherein said communication network comprises at least one of (1) modem to modem connection via telephone lines, and (2) at least one of transmitter and receiver communication via cable lines, fiber optical lines, microwave transmissions and satellite transmissions.

3. The interactive system of claim 1, wherein said controller comprises a central controller having: a first storage device for storing real time score values of each player of each participant's team;
    a second storage device for storing said real time score values for each player in the event; and a first computer for accessing at least one of said first and second storage devices.

4. The interactive system of claim 3, wherein said controller further comprises a second computer for converting statistical input data into real time score values for each player, and said first and second computers are coupled together by said communication network such that said first computer receives said real time score values.

5. The interactive system of claim 1, wherein said real time score values are displayed in a ticker tape format.

6. The interactive system of claim 1, wherein said real time scores are conveyed to the participant in audio form.

7. The interactive system of claim 1, wherein said video information comprises at least one of the event and a video program.

8. The interactive system of claim 1, wherein said interactive apparatus comprises one of a computer system, a telephone, a video monitor, touch sensors, a remote control, a voice synthesizer, and a combination thereof.

9. The interactive system of claim 1, wherein said real time scores are broadcast in alphabetical order of players in response to touch tone pad inputs by the participant.

10. The interactive system of claim 8, wherein said interactive apparatus further includes a touch tone pad for supplying participant entered data to said network.

11. The interactive system of claim 1, wherein said controller includes:

means for allowing the participant to access a first roster database containing real time score value of players in the event;

means for allowing the participant to select at least one member of the event to comprise a team for each participant of the interactive game; and means for allowing the participant to access a second roster database containing real time score values of players on the participant's team.

12. The interactive system of claim 11, wherein said interactive apparatus includes means for inputting commands to be sent to the controller such that the participant can add or delete a player to the team for optimizing the performance of the participant's team compared to other participants.

13. The interactive system of claim 11, wherein said interactive device includes:

means for enabling selecting the player from the team;

means for enabling selecting another player involved in the event; and means for enabling replacing the player with another player into the team.

14. The interactive system of claim 1, wherein the event is a sports competition.

15. The interactive system of claim 1, wherein the game is conveyed to a participant through a live broadcast.

16. The interactive system of claim 1, wherein the game is conveyed to the participant through a delayed broadcast.

17. The interactive system of claim 1, wherein the communication network conveys an on-line version of the game to a participant.

18. The interactive system of claim 1, wherein the game is played by a participant in real time on a first carrier system while the game is simultaneously broadcast live.

19. The interactive system of claim 18, wherein the game is played real time on the internet and/or an audio text delivery system while the game show airs live on television simultaneously.

20. The interactive system of claim 18, wherein the game is played real time on the internet and/or an audio text delivery system while the game show airs taped on television simultaneously.

* * * * *